United States Patent [19]

Simkowski

[11] Patent Number: 5,501,552
[45] Date of Patent: Mar. 26, 1996

[54] CONVEYING SYSTEM FOR UNSTABLE ARTICLES HAVING A NECK RING

[75] Inventor: Donald J. Simkowski, Loveland, Colo.

[73] Assignee: Goldco Industries, Inc., Loveland, Colo.

[21] Appl. No.: 235,354

[22] Filed: Apr. 29, 1994

[51] Int. Cl.⁶ .................................................. B65G 51/03
[52] U.S. Cl. ............................... 406/52; 406/68; 406/88; 406/109; 406/181; 198/450
[58] Field of Search ............................ 406/52, 62, 68, 406/86, 88, 181; 198/450, 723

[56] References Cited

U.S. PATENT DOCUMENTS

| | | |
|---|---|---|
| 3,523,604 | 8/1970 | Babunovic et al. . |
| 4,274,533 | 6/1981 | Abe . |
| 4,284,370 | 8/1981 | Danler et al. . |
| 4,724,035 | 2/1988 | Mann et al. . |
| 4,822,214 | 4/1989 | Aidlin et al. . |
| 4,938,636 | 7/1990 | Aidlin et al. . |
| 5,028,174 | 7/1991 | Karass . |
| 5,100,265 | 3/1992 | Mirkin . |
| 5,147,153 | 9/1992 | Aidlin et al. . |
| 5,161,919 | 10/1992 | Smith et al. . |
| 5,165,517 | 10/1992 | Auld et al. . |
| 5,246,097 | 9/1993 | McCoy et al. . |

*Primary Examiner*—Gary C. Hoge
*Attorney, Agent, or Firm*—Robert E. Harris

[57] ABSTRACT

A conveying system is disclosed for conveying unstable articles having a neck ring. Unstable articles, such as plastic bottles having a neck ring, or flange, are conveyed in single file along plural paths each of which is established by dual guides vertically spaced from one another a distance just sufficient to receive the neck rings of the articles therebetween, with the articles being urged in the downstream direction along each path by air acting solely on the top portion of the articles above the neck rings. A combiner unit controls single filing of articles conveyed along the plural paths to a discharge conveyor through use of star wheel actuators, the arms of a first group of which are moved in the downstream direction along the plural paths with the arms being configured to engage the neck rings of articles then on the plural paths and thereafter control movement of the articles in conjunction with a second group of star wheel actuators, the arms of which are also moved in the downstream direction along the plural paths.

18 Claims, 3 Drawing Sheets

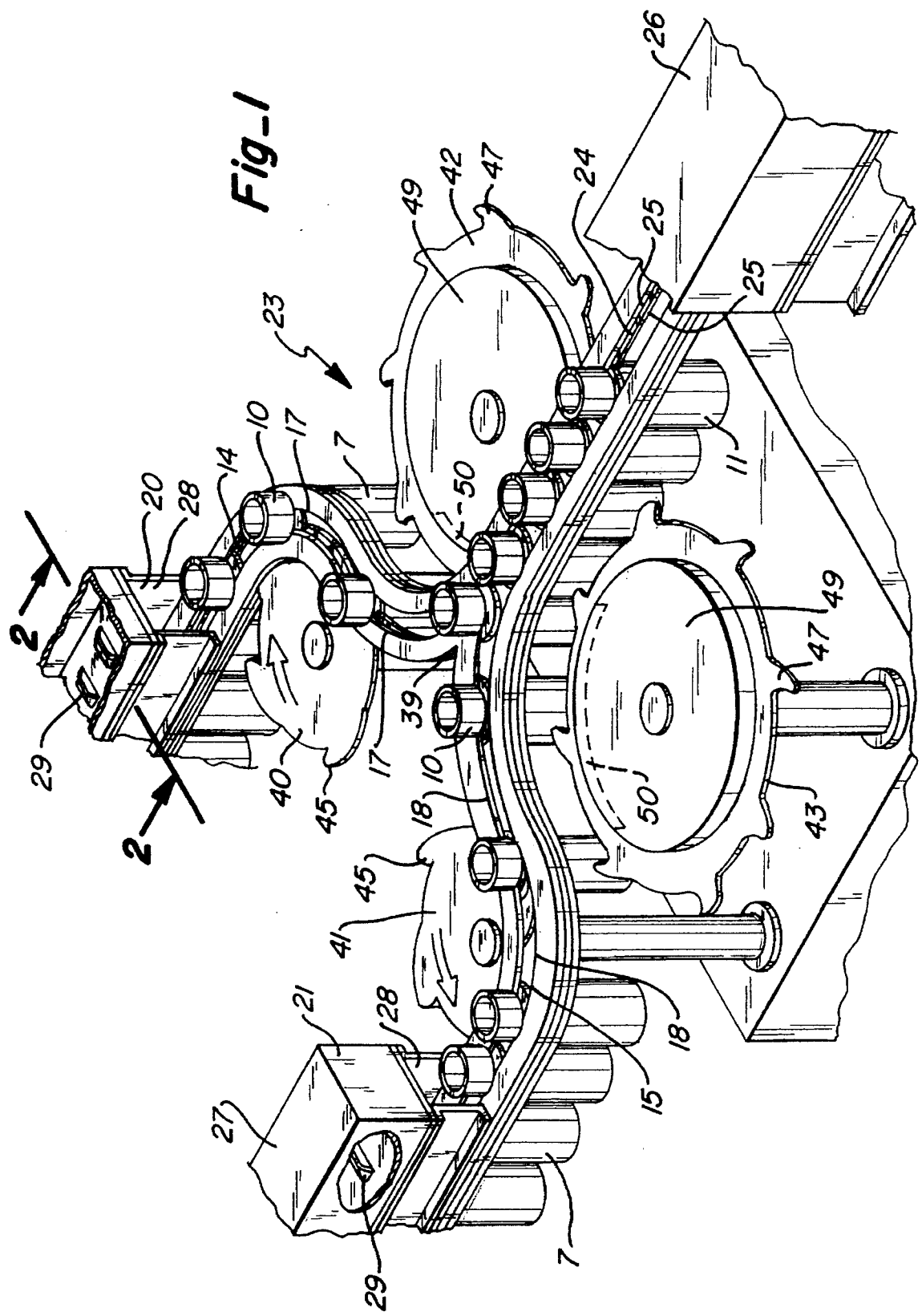

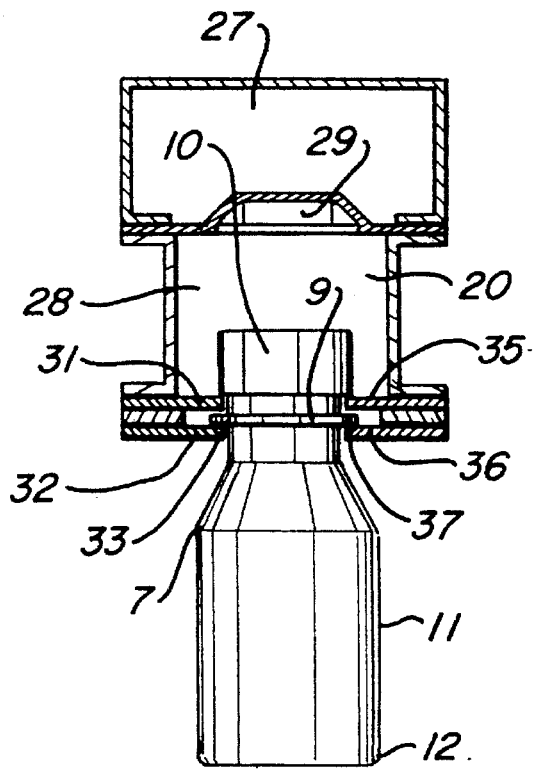
Fig_2
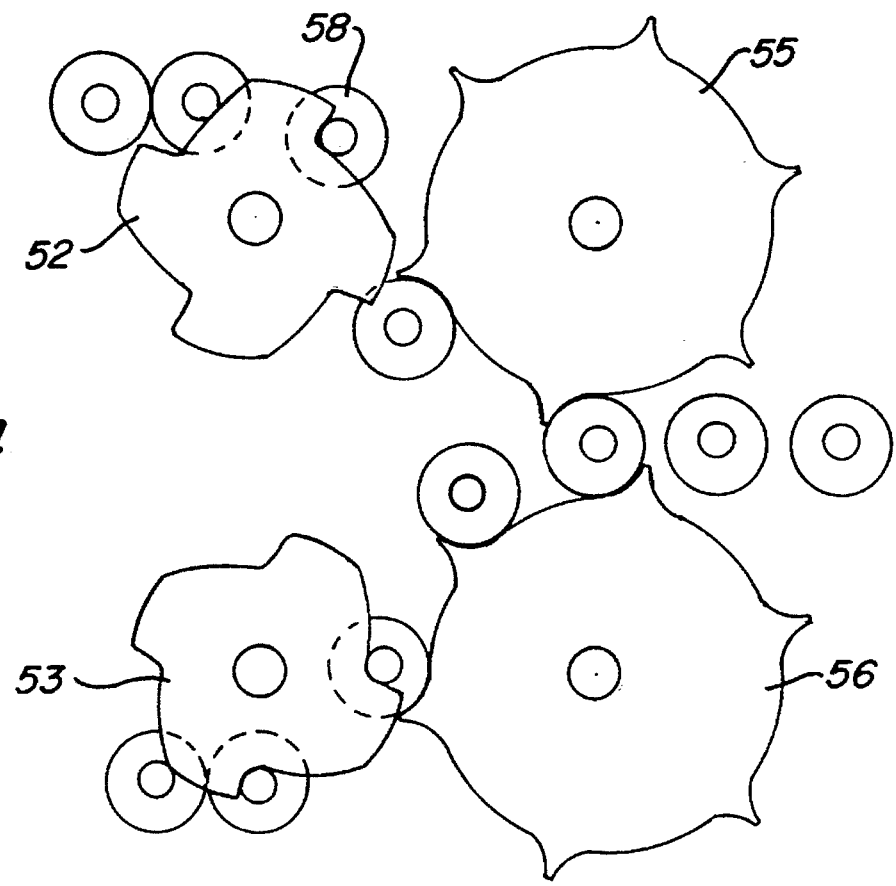
Fig_4

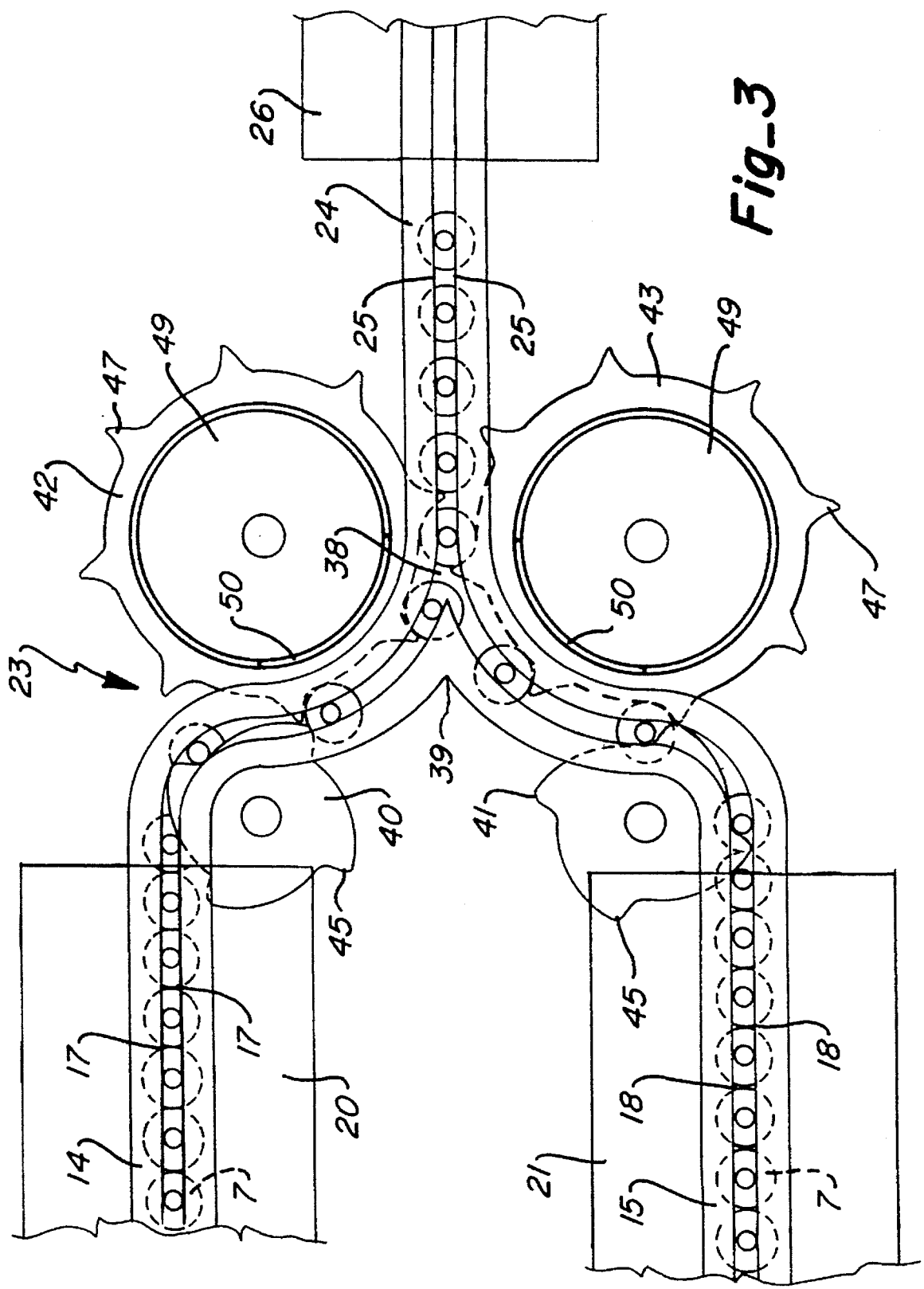

5,501,552

CONVEYING SYSTEM FOR UNSTABLE ARTICLES HAVING A NECK RING

FIELD OF THE INVENTION

This invention relates to an article conveying system, and, more particularly, relates to a conveying system for handling unstable articles having a neck ring.

BACKGROUND OF THE INVENTION

It is oftentimes necessary to convey articles between different locations, such as, for example, moving articles from one location to another in connection with manufacturing and/or filling of containers. While articles may sometimes be moved in mass between locations, it is often necessary that the articles be in single file when conveyed or supplied to a specific location, and devices for arranging articles in single file are now well known (see, for example, U.S. Pat. No. 4,500,229).

Particular difficulty has been encountered, however, in conveying unstable articles, such as plastic containers or bottles, in single file from one location to another location due to the tendency of such articles to easily tip during movement. Where such articles have a neck ring, it is now known that such articles can be successfully moved by providing guides to engage the bottom side of the neck ring and thereby suspend the article after which the article can be moved by air directed at the bottle (see, for example, U.S. Pat. Nos. 4,284,370, 4,724,035, 4,938,636, and 5,147,153), and, often, with the side portions of the bottles being restrained by side rails and the like (see, for example, U.S. Pat. Nos. 4,822,214, 5,028,174, 5,100,265, and 5,161,919).

It is also known to restrain articles, such as plastic bottles, from tilting or rotating during air urged movement of the articles in single file by supplying vertically spaced guides contacting both the top and bottom sides of the neck rings of the articles and supplying air to the top and side portions of the articles with skirts being also provided adjacent to the side portions of the articles (see, for example, U.S. Pat. No. 4,284,370).

It is likewise known that unstable articles being air conveyed along a path established by guides can be diverted to auxiliary, or other, paths through the use of diverters (see, for example, U.S. Pat. Nos. 4,822,214 and 4,938,636), and that various parts of articles can be combined at a combining station receiving at least a part of the article that has been conveyed to the combining station by means of a neck ring support air conveyor and a star wheel conveyor combination (see, for example, U.S. Pat. No. 4,724,035).

It is also known that plural lines of articles can be combined into a single line through use of star wheels (see, for example, U.S. Pat. Nos. 3,523,604, 4,274,533, and 5,165,517).

SUMMARY OF THE INVENTION

This invention provides an improved conveying system for conveying unstable articles having a neck ring along plural paths and combining the articles into a single path. Unstable articles, such as plastic containers or bottles having a neck ring, are conveyed in single file along plural paths established by guides and the articles are combined into a single path by a combiner unit having a plurality of actuators each of which has a movable portion that moves through the plural paths to engage and thereafter control movement of the articles along the paths so that the articles are placed in single file and moved onto a discharge conveyor. The guides preferably include a pair of guides vertically spaced apart from one another a distance just sufficient to receive the neck rings of the articles therebetween, the articles are preferably urged along each path by air acting solely on the top portions of the articles above the neck rings, and the actuators preferably include star wheels configured to pass between the pair of guides and engage the neck rings of the articles.

It is therefore an object of this invention to provide an improved article conveying system.

It is another object of this invention to provide an improved article conveying system for conveying unstable articles having a neck ring.

It is still another object of this invention to provide an improved conveying system for conveying unstable articles having a neck ring along a path established by spaced guides receiving the neck rings of the articles therebetween and urging the articles along the path by air acting solely on the top portion of the articles above the neck ring.

It is yet another object of this invention to provide an improved conveying system for conveying unstable articles having a neck ring that includes a combiner unit having movable portions movable through plural paths established by guides engaging the neck rings of the articles being conveyed with the movable portions engaging and thereafter controlling movement of the articles toward a single discharge path.

It is still another object of this invention to provide an improved conveying system for conveying unstable articles having a neck ring that includes a combiner unit having star wheels the arms of which move between vertically spaced guides establishing plural article paths to engage the neck rings of the articles being conveyed and thereafter control movement of the articles toward a single discharge path.

With these and other objects in view, which will become apparent to one skilled in the art as the description proceeds, this invention resides in the novel construction, combination and arrangement of parts substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a partial perspective view of the system of this invention;

FIG. 2 is a cross-section view taken through lines 2—2 of one of FIG. 1;

FIG. 3 is a partial top view of the system as illustrated in FIG. 1; and

FIG. 4 is an alternate embodiment of the system of this invention illustrating schematically the interaction between star wheels configured for larger articles than illustrated in FIG. 3.

DESCRIPTION OF THE INVENTION

As indicated in FIGS. 1 and 2, articles 7 to be conveyed by the system of this invention are articles, such as plastic containers or bottles, having a neck ring 9, a top neck portion 10 above neck ring 9, a side, or body, portion 11 below neck ring 9, and a bottom portion 12. As best shown in FIGS. 1 and 3, articles 7 are conveyed in single file along separate paths 14 and 15 established by neck guides 17 and 18, with neck guides 17 and 18 extending through air conveyors 20 and 21 and into combiner unit 23 where the plural paths 14 and 15 are merged into a single path 24 having neck guides 25 that extend from combiner unit 23 into discharge conveyor 26.

As indicated in FIGS. 1 and 2, air conveyors 20 and 21 each include an air plenum 27 and an air chamber 28 for receiving air through apertures 29 from air plenum 27 with air being directed into air chamber 28 in the downstream direction to contact the top portion 10 of articles then within the air chamber to urge the articles in the downstream direction along guides 17 and 18. As best shown in FIG. 2, air introduced into air conveyor 20 to urge the articles through the conveyor is introduced only into air chamber 28 through apertures 29 so that air is directed solely to top portion 10 of the articles then within the air chamber, with no air being directed toward the body portion 11 of the articles and with the body portion 11 of the articles not having constraints, such as rails, thereat to prevent tipping of the articles (air conveyor 21 is identical in structure to air conveyor 20).

As best shown in FIG. 2, neck guides 17 (neck guides 18 in air conveyor 21 are identical) preferably include a vertically spaced pair of guides 31 and 32 at one edge 33 of neck ring 9 of an article then positioned upright (as shown in FIG. 2) at the guides and a second vertically spaced pair of guides 35 and 36 at edge 37 of neck ring 9 opposite to that of edge 33. Each vertically spaced pair of guides (i.e., guides 31-32 and guides 35-36) are spaced from one another a distance just sufficient to allow the edges of neck rings 9 of articles to slide between each guide pair with the guides of each pair being closely adjacent to the opposite sides of the edges of the neck rings, and the vertically spaced pairs of guides are closely adjacent to the opposite sides of the neck portions of the articles but are horizontally spaced from one another a distance just sufficient to allow the neck portion of the articles to pass therebetween.

As shown in FIGS. 1 and 3, the vertically spaced pairs of guides extend through air conveyors 20 and 21 and also through combiner unit 23 until merged at guide junction 38 into single path 24 having neck guides 25 that establish a single path discharge from combiner unit 23 to discharge conveyor 26 to establish plural paths and then a single path through the system. As shown in FIGS. 1 and 3, the merger of guides 17 and 18 at guide junction 38 results in one of each of guides 17 and 18 terminating at point 39 so that extensions of the other one of each of guides 17 and 18 are thereafter spaced from one another to form guides 25 that extend from combiner unit 23 to discharge conveyor 26. Guides 25 are preferably identical to guides 17 and 18 as described above for guides 17 and 18 as they extend through air conveyors 20 and 21, and discharge conveyor 26 is preferably an air conveyor identical to air conveyors 20 and 21.

Combiner unit 23 is positioned in the downstream direction with respect to air conveyors 20 and 21. Combiner unit 23 includes a plurality of actuators, shown as star wheels 40, 41, 42 and 43. Star wheels 40 and 41 have a plurality of arms 45 configured as best shown in FIG. 3 to engage the neck rings of each succeeding article moving along the path associated with the star wheel as the star wheel is rotated (as indicated in FIG. 3, star wheels 40 and 41 are identical and each has four arms 45, it being realized, however, that the star wheels could have a different number of arms and/or configuration as needed or desired, as shown, for example, in FIG. 4). The arms of star wheels 40 and 41 have a width less than that of the vertical spacing between the guide pairs to allow the star wheel arms to pass between the guide pairs to engage only the neck rings of articles (as indicated in FIG. 3, the vertically spaced pairs of guides do not have a spacer therebetween in the portion adjacent to star wheels 40 and 41 to allow the star wheels to pass between the guides).

Upon engagement of the articles by an arm of a star wheel, further movement of the star wheel engaged article downstream along the path is controlled by rotation of the star wheel. As best indicated in FIG. 3, each arm of star wheels 40 and 41 is configured to also engage the neck ring of the article immediately following the article then to be conveyed by the star wheel and prevent movement of the article immediately following until the star wheel has been rotated a sufficient distance such that the article immediately following is received in the pocket of the next arm of the star wheel and is moved downstream by that arm.

Star wheels 42 and 43 are positioned downstream from star wheels 40 and 41, respectively, and each of star wheels 42 and 43 have article engagable arms 47 for engaging succeeding articles moved along paths 14 and 15, respectively, by star wheels 40 and 41 (as indicated in FIG. 1, star wheels 42 and 43 are identical and each is indicated as having eight arms 47, it being realized that a different number of arms and/or configuration could be utilized, such as, for example, as shown for larger articles in FIG. 4, so long as the number utilized and/or configuration is compatible with the number of arms of star wheels 40 and 41 to allow engagement and movement of articles as set forth herein).

As indicated, star wheels 42 and 43 move the articles along paths 14 and 15 to guide junction 38 where the articles are moved into single path 24 with the articles then being moved by star wheels 42 and 43 along single path 24 toward discharge conveyor 26. With articles conveyed along both of paths 14 and 15, and with the arms of star wheels 40–41 and 42–43 being rotatively offset from one another as indicated in FIG. 3, this allows the articles to be alternately deposited on the discharge conveyor in single file when dual infeed paths are utilized.

Star wheels 40, 41 42, and 43 are preferably rotated by a common driver, such as an electric motor, through a series of gears so that the arms of star wheels 40 and 41 remain rotatively offset from one another, so that the arms of star wheels 42 and 43 remain rotatively offset from one another, and so that the arms of star wheels 40 and 42 and the arms of star wheels 41 and 43 remain aligned at the point of transfer of articles between the star wheels, as indicated in FIGS. 3 and 4. It is to be realized, however, that variations, such as, for example, variations in conveyor speeds, could require variations in star wheel configurations.

As indicated in FIGS. 1 and 3, disk 49 is positioned above each of star wheels 42 and 43. Disk 49 is in fixed position and does not rotate along with the star wheels. As indicated, disk 49 has aperture 50 therein facing outwardly from the edge of the disk and through which a vacuum is drawn to maintain articles against the star wheel from transfer of the articles from star wheels 40 and 41 to a single line at single line path 24. As indicated, combining of dual paths 14 and 15 requires termination of one of guides 17 and one of guides 18 at point 39 as the guides are merged between star wheels 42 and 43. As shown, the vacuum is drawn during about ninety degrees of rotation of star wheels 42 and 43 commencing at the point of transfer of articles from star wheels 40 and 41 to star wheels 42 and 43, respectively.

In operation, as each star wheel 40 and 41 is rotated, each arm in succession first comes into engagement with the neck ring of the first article then in the single file line while precluding movement of the article next in line from movement in the downstream direction, after which the article then first in line is moved in the downstream direction as rotation of the star wheel is continued. After rotation of star wheel 40 or 41 about ninety degrees (where four arms are utilized), the associated second star wheel (star wheel 42 or 43) comes into engagement with the lower, or base, portion of the article and thereafter moves the article from the dual paths to form a single path for conveying the articles in single file toward discharge, or output, conveyor 26 (this requires a rotation of star wheels 42 and 43 of about ninety degrees (where eight arms are utilized).

An alternate embodiment of the system of this invention is illustrated schematically in FIG. 4. In this embodiment, the structure is essentially the same as described above, except that star wheels 52 and 53 (comparable to star wheels 40 and 41) have a different contour from that of star wheels 40 and 41, and star wheels 55 and 56 (comparable to star wheels 42 and 43) have both a different contour and a different number of arms from that of star wheels 42 and 43. As indicated in FIG. 4, articles 58 conveyed through the alternate embodiment of the system are larger than articles 7 conveyed through the embodiment of the invention as shown in FIGS. 1 through 3.

As can be appreciated from the foregoing, articles are continuously suspended by the guides (with the aid of the vacuum at star wheels 42 and 43 adjacent to guide merger 38) as the articles are moved through the infeed conveyors (conveyors 20 and 21), combining unit 23, and discharge conveyor 26. If articles are being moved through dual infeed conveyors, then the articles are alternately taken from each infeed conveyor by the combining unit and deposited in single file on the discharge conveyor with the arms of the star wheels preferably being selected and contoured such that the articles are only slightly spaced from one another.

If articles are being conveyed along only one infeed conveyor (or if it is desired that articles be conveyed to the discharge conveyor from a single infeed path), then the star wheel arrangement will transfer the articles from the single path to the discharge conveyor with a space between each article that can be eliminated by discharge conveyor 26 moving the articles at a greater speed than that imparted to the articles by the star wheels (the star wheels, for example, will provide articles in single file to the discharge conveyor at a rate of 960 to 1,000 articles per minute).

As can be appreciated from the foregoing, this invention provides an improved system for conveying unstable articles and, particularly, conveying unstable containers such as plastic bottles having a neck ring.

What is claimed is:

1. An article conveying system for conveying articles having neck portions, said system comprising:

input conveying means having a portion engaging the neck portions of the articles for conveying the articles along plural paths in single file;

output means having a portion engaging the neck portions of the articles; and combining means positioned to receive the articles in single file from each of said plural paths of said input conveying means, said combining means including guide means engagable with the neck portions of the articles received from said input conveying means and guiding the articles in a downstream direction through said combining means with the articles being discharged in single file from said combining means to said output means, and said combining means also including actuating means having a portion movable in said downstream direction for engaging the neck portions of the articles and thereafter, while continuing said engagement of the neck portions of the articles by said actuating means, urging the articles through at least a portion of said combining means in said downstream direction.

2. The system of claim 1 wherein the neck portion of each of the articles has a neck ring, wherein said portion of said input conveying means engaging the neck portions of the articles includes guide means engagable with said neck rings of each of the articles to establish said plural paths and guide the articles along said plural paths, and wherein said input conveying means also includes air conveying means associated with each of said plural paths to urge the articles along said plural paths.

3. The system of claim 2 wherein said air conveying means includes means for directing said air solely onto the neck portions of the articles.

4. The system of claim 1 wherein the neck portions of the articles include neck rings, and wherein said guide means of said combining means includes a pair of guides each of which is positioned at opposite sides of said neck rings of the articles and contactable with said neck rings at said opposite sides thereof.

5. The system of claim 4 wherein said guides are spaced from one another in a direction such that said neck rings of the articles are received therebetween, and wherein said movable portions of said actuating means of said combining means is also received between said guides whereby said movable portions of said actuating means engages said neck rings of the articles to cause movement of the articles through said combining means.

6. The system of claim 1 wherein the neck portions of the articles include neck rings, wherein said portion of said output means engaging the neck portions of the articles includes guide means engagable with said neck rings of the articles to guide the articles away from said combining means, and wherein said output means also includes air conveying means for urging the articles along said guide means.

7. The system of claim 1 wherein said actuating means of said combining means includes a star wheel associated with each of said plural paths with each said star wheel having a plurality of arms for engaging different ones of the articles and controlling movement of the articles in said downstream direction.

8. The system of claim 7 wherein said arms of said star wheels are configured to be receivable between the neck portions of adjacent articles and provide separation between said adjacent articles as the articles are moved through said combining means.

9. The system of claim 7 wherein said actuating means includes a second star wheel associated with each of said plural paths with each of said second star wheels including a plurality of arms for engaging different ones of the articles for controlling movement of the articles along said plural paths, each of said second star wheels having vacuum means for maintaining the articles against said second star wheels during at least a portion of the movement of the articles through said combining means.

10. The system of claim 9 wherein said arms of said star wheels associated with each of said plural paths are offset with respect to one another when moving through said paths, and wherein said arms of each of said star wheels and said second star wheels in each of said paths are aligned with one another at a point of transfer of control of the articles from said star wheels to said second star wheels.

11. An article conveying system for conveying articles having neck portions, said system comprising:

first conveying means including first and second portions with at least said first portion of said first conveying means being an air conveyor to urge movement of the articles, and said first and second portions of said first conveying means including guide means engagable with the neck portions of the articles to be conveyed and guiding the articles in single file along a first predetermined path;

first actuating means at said second portion of said first conveying means, said first actuating means having a movable portion movable along said first predetermined path for engaging the neck portions of the articles and urging the articles along said first predetermined path;

second conveying means including first and second portions with at least said first portion of said second conveying means being an air conveyor to urge movement of the articles, said first and second portions of said second conveying means including guide means engagable with the neck portions of the articles to be conveyed and guiding the articles in single file along a second predetermined path;

second actuating means at said second portion of said second conveying means, said second actuating means having a movable portion movable along said second predetermined path for engaging the neck portions of the articles and urging the articles along said second predetermined path; and discharge conveying means having a portion engaging the neck portions of the articles, said discharge conveying means receiving, in single file, the articles urged along said first and second predetermined paths by said movable portions of said first and second actuating means.

12. The system of claim 11 wherein the neck portions of the articles include neck rings, and wherein said air conveyors include dual guides with said neck rings of the articles being received therebetween.

13. The system of claim 12 wherein said movable portions of said first and second actuating means are received between said dual guides to engage said neck rings of the articles.

14. The system of claim 13 wherein said first and second actuating means are star wheels having arms, and wherein said arms of said star wheels are received between said dual guides.

15. The system of claim 11 wherein the neck portions of the articles include neck rings and top portions above said neck rings, and wherein said air conveyors include means for directing air solely to said top portions of the articles to be conveyed.

16. The system of claim 11 wherein each of said first and second actuating means include first and second star wheels each of which has a plurality of arms, wherein each of said first star wheels is smaller in size than said second star wheels, and wherein said movable portions of said first and second actuating means are said arms of said first star wheels.

17. The system of claim 16 wherein said second star wheels of said first and second actuating means include vacuum means for maintaining the articles being conveyed against said second star wheels during at least a portion of the movement of the articles under the control of said second star wheels.

18. The system of claim 17 wherein said vacuum means extends about one-fourth of a complete rotation of said second star wheels.

* * * * *